(12) United States Patent
Currie et al.

(10) Patent No.: US 6,355,136 B1
(45) Date of Patent: Mar. 12, 2002

(54) BALL SCREW TIRE TREAD GUIDE

(75) Inventors: William Dudley Currie, Stow; James Michael Hart, Akron; Patrick David Marks, Uniontown, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/463,546
(22) PCT Filed: Aug. 4, 1997
(86) PCT No.: PCT/US97/12870
§ 371 Date: Dec. 21, 1999
§ 102(e) Date: Dec. 21, 1999
(87) PCT Pub. No.: WO99/06205
PCT Pub. Date: Feb. 11, 1999

(51) Int. Cl.⁷ .................................................. B29D 30/30
(52) U.S. Cl. .................................. 156/405.1; 156/128.1
(58) Field of Search ........................ 156/405.1, 406.4, 156/406.6, 130, 128.1; 226/196.1; 193/35 C; 198/836.3

(56) References Cited

U.S. PATENT DOCUMENTS

| | | | |
|---|---|---|---|
| 2,346,439 A | 4/1944 | Leguillon | 154/10 |
| 3,393,112 A | 7/1968 | Brown | 156/405 |
| 3,413,174 A | 11/1968 | Porter | 156/405 |
| 3,949,920 A | 4/1976 | Habert et al. | 226/198 |
| 4,049,486 A | 9/1977 | Henley | 156/405 |
| 4,261,786 A | 4/1981 | Martin et al. | 156/406 |

FOREIGN PATENT DOCUMENTS

| EP | 0634267 | 1/1995 |
|---|---|---|
| FR | 7412935 | 11/1974 |

OTHER PUBLICATIONS

Otto Krausskopf–Verlag GmbH, Book Series :Oil Hydraulics and Pneumatics, 1978, 1–7 (of translation).

English Abstract for JP 6–155,193, Patent Abstracts of Japan, Jun. 3, 1994.

*Primary Examiner*—Geoffrey L. Knable
(74) *Attorney, Agent, or Firm*—Frederick K. Lacher; Goodyear Tire & Rubber Co.

(57) ABSTRACT

Tread guides (24, 26, 28) supported on a frame (16) over a conveyor (10) have rollers (28) for engaging edges of the tread (14) an the conveyor and a constant centering force is provided by ball nuts (50, 52) in engagement with a ball screw (44) connected to a pneumatic torque applying actuator (56). Conicity adjustment (62, 66) is provided by lateral adjustment of the ball screw (44), ball nuts (50, 52) and tread guide assembly as a unit relative to the conveyor (10).

6 Claims, 3 Drawing Sheets

BALL SCREW TIRE TREAD GUIDE

TECHNICAL FIELD

This invention relates to an apparatus for applying a constant centering force on the edges of tire tread rubber as it travels across an application conveyor to a tire drum. Conicity offset adjustment is also provided by adjusting the position of the center line of the tread relative to the center line of the tire building drum.

BACKGROUND ART

Apparatus for applying a uniform force perpendicular to the axis of the tread as it travels across an application conveyor toward a tire building drum is shown and described in U.S. Pat. No. 5,389,187. The method of applying the force is shown and described in U.S. Pat. No. 5,534,093. In accordance with the method and apparatus of these patents, the tread is conveyed on a conveyor between two self-centering guides which are slidably mounted on a frame positioned over the conveyor. The guides have parallel rows or rollers for engaging opposite edges of the tread and are urged toward the tread edges by a pneumatic, double-acting piston cylinder assembly connected to the guides by pulleys and cables. The piston cylinder assembly is connected to a centering screw for adjusting the position of the tread centerline.

U.S. Pat. No. 3,413,174 is directed to a conveyor apparatus having guide rolls for adjusting the longitudinal center line of the tread, however, no provision is made for accommodating a variable width of the tread. U.S. Pat. No. 4,261,286 is directed to a conveyor apparatus having a pair of threaded shafts to rotate in threaded shoulder guides urging them towards the center of a tread with a motor rotating the shafts, however, there is no disclosure of a single ball screw extending between supporting frame members for moving two tire tread guides together and providing a continuous constant force against each side of a tire tread.

The publication Grundlagen der Preumatik Auto Krausskopf-Verlag GmbH, Mainz sets forth the rotational momentum behavior of compressed air motors. With reference made to FIG. 40 which shows characteristic curves of a compressed air motors has a function of "n" (rotation speed) there is no disclosure of using a pneumatic rotary actuator which does not rotate at a rotational speed, but only applies torque to a ball screw for urging nut members of guides toward the edges of a tread.

DISCLOSURE OF INVENTION

The present invention is directed to apparatus for applying a constant centering force on the edges of tread rubber as it is carried by an application conveyor toward a tire building drum. The constant centering force is provided by a ball screw and nut assembly, with the ball screw torque controlled by a pneumatic rotary actuator connected to the screw. An adjustment sleeve provides conicity offset adjustment by moving the entire ball screw and nut assembly laterally along the axis of the ball screw whereby the position of the center line of the tread may be adjusted slightly relative to the center line of the tire building drum.

In accordance with one aspect of the invention, there is provided apparatus for conveying a tire tread comprising a conveyor with two guides extending over the conveyor and having rollers engageable with side edges of the tread, characterized by the guides having nut members engageable with a ball screw extending between supporting frame members for moving the guides together or apart by rotating the ball screw and torque applying means including a pneumatic rotary actuator connected to the ball screw for applying torque to the ball screw to urge a nut member of a first one of the guides toward a first edge of the tread and a nut member of a second one of the guides toward a second edge of the tread and the torque applying means including a pneumatic rotary actuator connected to the ball screw providing a continuous constant force at each side of the tire tread by the rollers while in contact with the tread regardless of the variation in width of the tread, a clutch mounted between the ball screw and the pneumatic rotary actuator at a first end of the hall screw and manual means to rotate the screw mounted at a second end of the screw whereby the initial spacing of the guides may be provided by manually rotating the ball screw and whereby the torque forces may be applied by actuating the clutch to engage the pneumatic rotary actuator. Further embodiments of the invention are defined in the dependent claims.

DETAILED DESCRIPTION OF THE INVENTION

Figure 1:
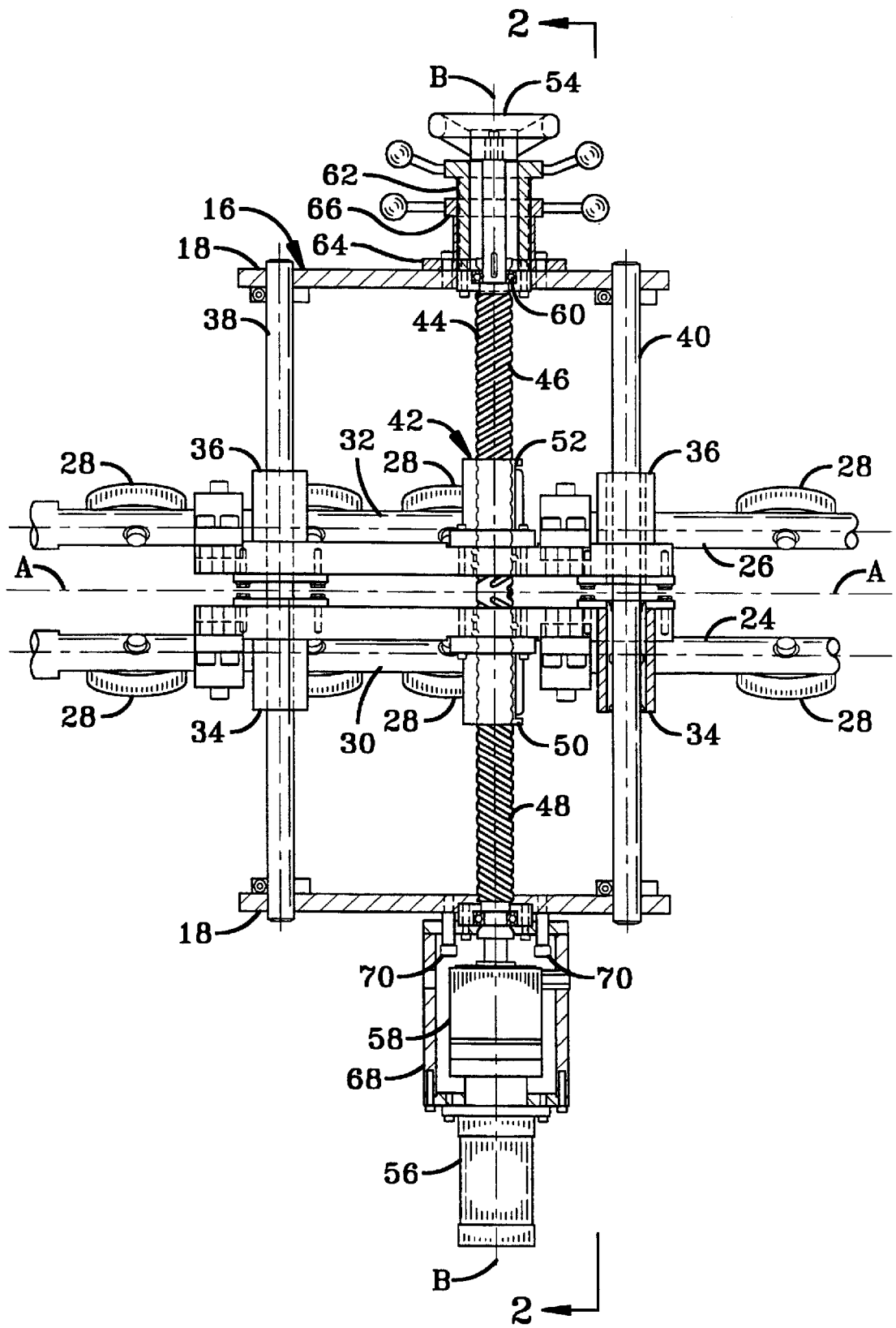
FIG. 1 is a plan view partly in section of the tread centering apparatus embodying the invention with the conveyor deleted taken along the plane of line 1—1 in FIG. 2.
Figure 2:
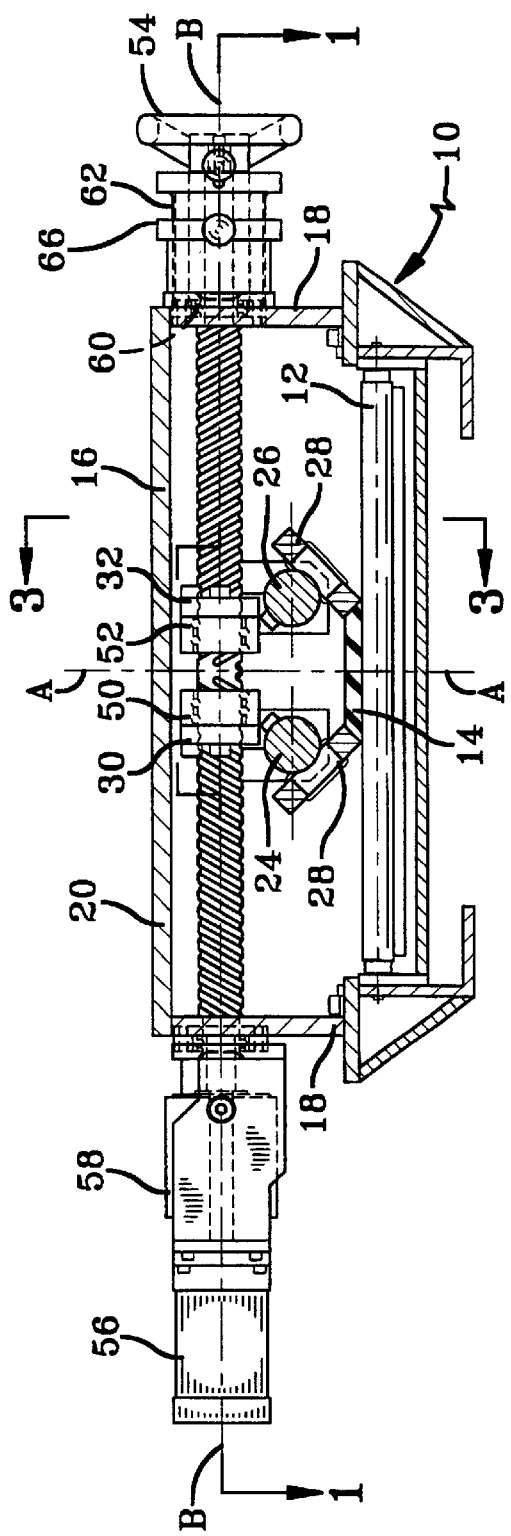
FIG. 2 is a sectional view of the apparatus shown in FIG. 1 with the conveyor taken along the plane of line 2—2 in FIG. 1.
Figure 3:
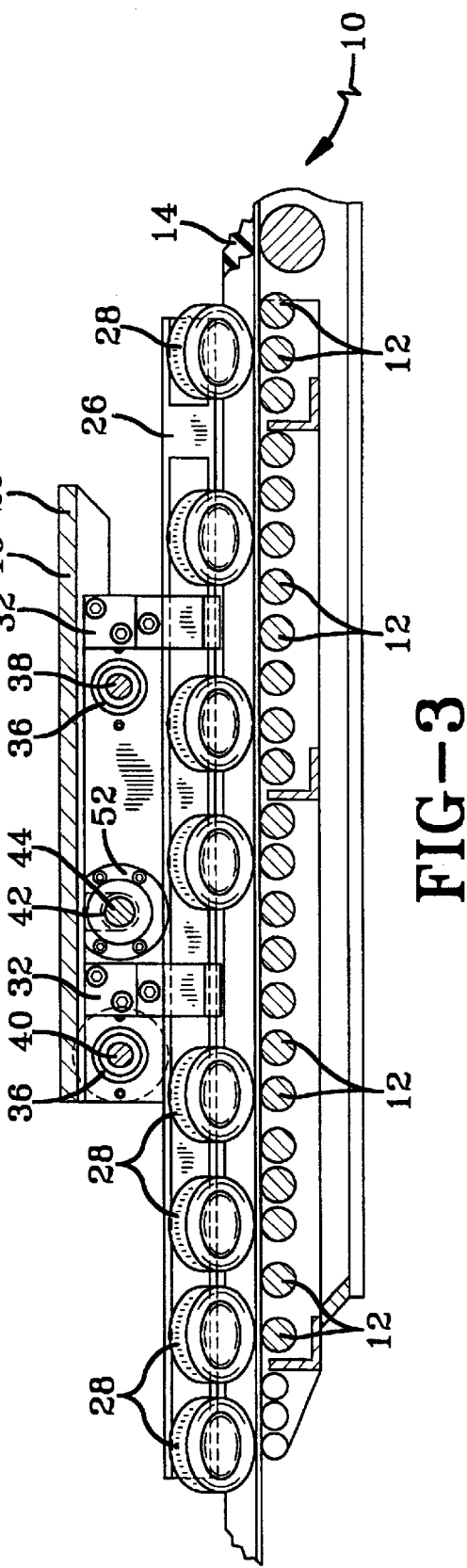
FIG. 3 is a sectional view taken along the line 3—3 in FIG. 2.

Referring to FIGS. 2 and 3, a tread application conveyor 10 is shown having rollers 12 for supporting a tread 14 as it travels over the conveyor towards a tire building drum (not shown). A frame 16, having side members 18 and a top member 20, is mounted on the conveyor 10 and positioned over the conveyor. As shown in FIG. 1, two guides such as long rod assemblies 24 and 26 with ball bearing rollers 28 are suspended in housings 30 and 32 positioned above either side of the tread 14. The angular orientation of the rod assemblies 26 may be adjusted to place the rollers 28 in optimum locations to engage the shoulders of the tread 14. The housings 30 and 32 have bushings 34 and 36 slidably mounted on linear ways or rods 38 and 40 clamped to the side members 18 of carrier frame 16.

Figure 4:
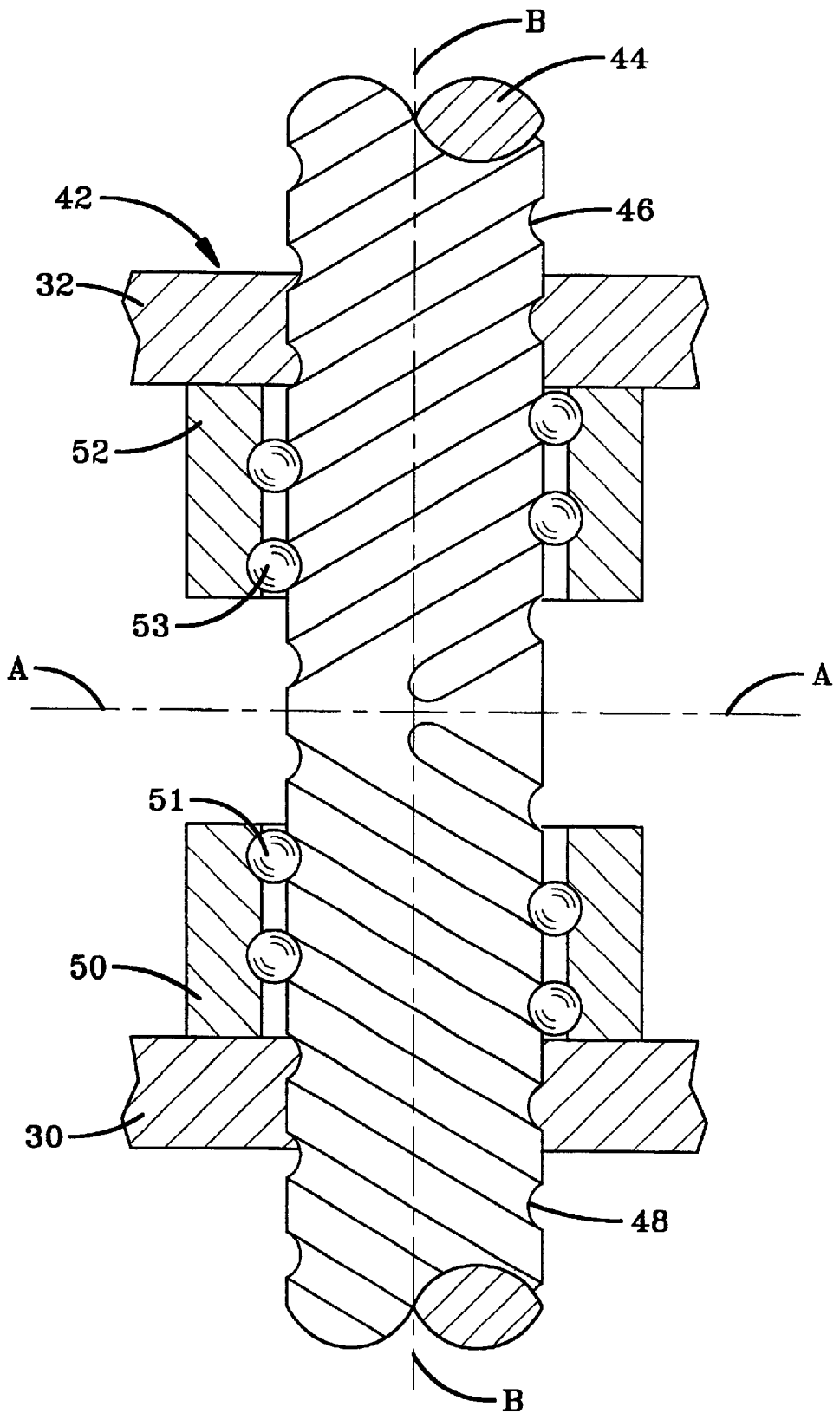
FIG. 4 is an enlarged fragmentary sectional view showing the ball screw nuts and the balls with the left-hand and right-hand grooves of the ball screw.

A ball screw assembly 42 is positioned between the rods 38 and 40 generally at the center of the tread guiding apparatus. A ball screw 44, shown more clearly in FIG. 4, is divided at its center line A—A into right-hand threads 46 at one side, and left-hand threads 48 at the other side. A left-hand ball screw nut 50 having a ball 51 is attached to the left-hand housing 30. A right-hand ball screw nut 52 having a ball 53 is attached to the right-hand housing 32. Accordingly, when the ball screw 44 is rotated the relative distance between the housings 30 and 32 will be increased or decreased. A hand wheel 54 may be mounted at one end of the ball screw 44 and a torque applying means, such as a pneumatic rotary actuator 56, may be mounted at the other end of the screw 44. A clutch 58 may be positioned between the ball screw 44 and the pneumatic rotary actuator 56. It is understood that other means, such as weights carried by cables wound around the ball screw 44 may be provided to supply the torque needed for the operation of this apparatus.

Referring to FIGS. 1 and 2 a screw support bearing 60 is positioned inside a conicity adjustment sleeve 62 having external threads in mating engagement with threads on a mounting bracket 64, which is attached to one of the side members 18 of the frame 16. A lock nut 66 may be provided to hold the adjustment sleeve 62 in place. In order to adjust the rod housings 28 and 30 laterally along the axis B-B of the ball screw 44, the lock nut 66 may be loosened and the conicity adjustment sleeve 62 rotated in the desired direction. This adjustment is used to move the center line of the tread 14 slightly from the center line of the tire building drum to improve conicity readings and is referred to as the "conicity offset adjustment."

At the other end of the ball screw 44 from the conicity adjustment sleeve 62 a housing 68 holding the rotary actuator 56 and surrounding the clutch 58 is slidably mounted on shoulder screws 70, threaded in the other one of the side members 18 of the frame 16, permitting the housing to move relative to the frame during the conicity offset adjustment.

In operation, the ball screw 44 provides width adjustment and centering for the self-centering rod assemblies 24 and 26. Adjustment of the distance between the rod assemblies 24 and 26 is provided by disengaging the clutch 58 and rotating the ball screw with the hand wheel 54 until the rod assemblies 24 and 26 reach the desired spacing. Preferably this is a setting which spaces the rollers 28 at a distance slightly narrower than the width of tread 14. The clutch 58 may then be engaged, coupling the ball screw 44 to the rotary actuator 56 to drive the rod assemblies 24 and 26 towards the center line A—A and providing centering of the rod assemblies 24 and 26.

In addition to centering, the tread guide of this invention utilizes the ball screw 44 to hold the housings 30 and 32 in a position with torque applied to the end of the ball screw by the pneumatic rotary actuator 56. This torque provides resistance to rotation of the ball screw 44 as the edges of the tread 44 press against the rollers 28 in a direction to open the space between the rollers. The torque provided may be changed by changing the air pressure in the pneumatic rotary actuator 56.

Before the tread 14 reaches the guide rollers 28 on the conveyor 10, the shaft of the pneumatic rotary actuator 56 may be positioned at one limit of its 280 degree travel, placing the housings 30 and 32 and rollers 28 at a spaced distance apart slightly less than the width of the tread. When the tread 14 reaches the rollers 28 and the edges make contact with the rollers, the rollers will be forced to open slightly. Contact with the rollers 28 at the left-hand housing 30 causes the ball 51 of the ball nut 50 to move along the axis B—B of the screw 44 in a direction away from the centerline A—A of the ball screw 44 rotating the screw so that the right-hand ball screw nut 52 is moved by a ball 53 of the ball nut 52 causing the right-hand housing 32 with the rollers 23 to be moved in the opposite direction. Large lead on the ball screw 44 make it possible to translate linear motion into rotary motion due to the mechanical efficiency of the screw and nut combination. As the housings 30 and 32 are forced open, the restoring torque force applied by the rotary actuator 56 attempting to close them remains constant. This constant force allows the tread 14 to be stretched uniformly over its length as it is delivered on center to the tire building drum.

While a certain representative embodiment and details have been shown for the purpose of illustrating the invention, it will be apparent to those skilled in the art that various changes and modifications may be made therein without departing from the spirit or scope of the invention.

Having thus described the invention it is now claimed:

1. Apparatus for conveying a tire tread comprising a conveyor with two guides extending over said conveyor and having rollers engageable with opposite side edges of said tread, characterized by said guides having nut members engageable with a ball screw extending between supporting frame members for moving said guides together or apart by rotating said ball screw and torque applying means including a pneumatic rotary actuator connected to said ball screw for applying torque to said ball screw to urge a nut member of a first one of said guides towards a first edge of said tread and a nut member of a second one of said guides toward a second edge of said tread, said pneumatic rotary actuator providing a continuous constant force against each side of said tire tread by said rollers while in contact with said tread regardless of the variation in width of said tire tread, a clutch mounted between said ball screw and said pneumatic rotary actuator at a first end of said ball screw and manual means to rotate said screw mounted at a second end of said screw whereby the initial spacing of said guides may be provided by manually rotating said ball screw and whereby the torque forces may be applied by actuating said clutch to engage said pneumatic rotary actuator.

2. Apparatus in accordance with claim 1 wherein said ball screw has a large lead whereby linear motion of said nut members is translated into rotary motion due to the mechanical efficiency of the combination of said screw and said nut members.

3. Apparatus in accordance with claim 1 further characterized by conicity adjustment means for moving said ball screw with said guides laterally along the axis of said ball screw to adjust the position of the center line of the tread on said conveyor.

4. Apparatus in accordance with claim 3 further characterized by said conicity adjustment means comprising an adjustment sleeve in threaded engagement with a screw support bearing in one of said frame members.

5. Apparatus in accordance with claim 1 further characterized by each of said guides having a rod, a plurality of rollers mounted on said rod for rotation in engagement with a slanted edge of said tire tread and means for tilting the rotational axis of said rollers to correspond with the slanted edges of said tire tread.

6. Apparatus in accordance with claim 1 further characterized by said guides being slidably supported on rods mounted on said frame members parallel to and spaced from said ball screw whereby substantially all the weight of said guides is carried by said rods.

* * * * *